(12) United States Patent
Wang et al.

(10) Patent No.: US 11,949,136 B2
(45) Date of Patent: Apr. 2, 2024

(54) PH-GRADIENT-ENABLED MICROSCALE BIPOLAR INTERFACES FOR DIRECT LIQUID-FUEL/OXIDANT FUEL CELLS

(71) Applicants: Zhongyang Wang, St. Louis, MO (US); Vijay K. Ramani, St. Louis, MO (US); Shrihari Sankarasubramanian, St. Louis, MO (US)

(72) Inventors: Zhongyang Wang, St. Louis, MO (US); Vijay K. Ramani, St. Louis, MO (US); Shrihari Sankarasubramanian, St. Louis, MO (US)

(73) Assignee: Washington University, St. Louis, MO (US)

( * ) Notice: Subject to any disclaimer, the term of this patent is extended or adjusted under 35 U.S.C. 154(b) by 221 days.

(21) Appl. No.: 17/081,174

(22) Filed: Oct. 27, 2020

(65) Prior Publication Data
US 2022/0052365 A1    Feb. 17, 2022

Related U.S. Application Data

(63) Continuation-in-part of application No. 16/379,212, filed on Apr. 9, 2019, now Pat. No. 11,616,246.

(60) Provisional application No. 62/928,010, filed on Oct. 30, 2019, provisional application No. 62/654,870, filed on Apr. 9, 2018.

(51) Int. Cl.
*H01M 8/083* (2016.01)
*H01M 8/1004* (2016.01)

(52) U.S. Cl.
CPC .......... *H01M 8/083* (2013.01); *H01M 8/1004* (2013.01); *H01M 2300/0014* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 4,362,789 A * | 12/1982 | Dighe | F28B 3/04 429/444 |
| 5,523,177 A * | 6/1996 | Kosek | H01M 4/928 429/480 |
| 5,958,616 A * | 9/1999 | Salinas | H01M 8/1039 429/522 |
| 8,557,473 B2 | 10/2013 | Fehervari | |
| 8,895,196 B2 | 11/2014 | Unlu et al. | |
| 9,393,557 B2 | 7/2016 | Ehrenberg et al. | |
| 2006/0141307 A1* | 6/2006 | Ryoichi | H01M 8/04186 429/513 |
| 2011/0274990 A1* | 11/2011 | Xu | H01M 8/04291 429/408 |
| 2015/0064581 A1 | 3/2015 | Unlu et al. | |
| 2019/0312293 A1* | 10/2019 | Ramani | H01M 4/92 |

FOREIGN PATENT DOCUMENTS

| | | |
|---|---|---|
| JP | 2005332800 A | 12/2005 |
| WO | WO 00/24073 | * 4/2000 |

OTHER PUBLICATIONS

Glycol, available at https://www.britannica.com/science/glycol, date unknown.*
Noble Metals: Definition, List, Properties, and Examples, Science ABC, available at https://www.scienceabc.com/pure-sciences/what-are-noble-metals.html, Jan. 2022 (Year: 2022).*
Arges et al., "Bipolar polymer electrolyte interfaces for hydrogen-oxygen and direct borohydride fuel cell", International Journal of Hydrogen Energy, 2015, vol. 39, No. 26, pp. 14312-14321 (includes Supplemental Information).
Ünlü et al., "Hybrid Anion and Proton Exchange Membrane Fuel Cells", The Journal of Physical Chemistry, 2009, vol. 113, No. 26, pp. 11416-11423.
Ünlü et al., Study of Alkaline Electrodes for Hybrid Polymer Electrolyte Fuel Cells. Journal of The Electrochemical Society, 2010, vol. 157, No. 10, pp. B1391-B1396.
Ünlü et al., "Hybrid Polymer Electrolyte Fuel Cells: Alkaline Electrodes with Proton Conducting Membrane", 2010, Angewandte Chemie International Edition, vol. 49, No. 7, pp. 1299-1301.
Wang et al., "Efficient pH-gradient-enabled microscale bipolar interfaces in direct borohydride fuel cells", Nature Energy, 2019, vol. 4, pp. 281-289.

* cited by examiner

*Primary Examiner* — Anca Eoff
(74) *Attorney, Agent, or Firm* — Armstrong Teasdale LLP

(57) ABSTRACT

Described herein are direct liquid fuel cells with an alkaline anodic fuel stream including a solution of liquid fuel such as alcohols, ethers, glycols or compounds of hydrazine, and an acidic cathode oxidant stream including a solution of a suitable oxidant such as hydrogen peroxide or a gas steam with 1% to 100% $O_2$. These cells are used as primary stationary and/or mobile power sources and also function in a secondary role as range extenders when coupled with a primary power source.

19 Claims, 7 Drawing Sheets

PH-GRADIENT-ENABLED MICROSCALE BIPOLAR INTERFACES FOR DIRECT LIQUID-FUEL/OXIDANT FUEL CELLS

CROSS-REFERENCE TO RELATED APPLICATIONS

This application is a continuation-in-part of U.S. patent application Ser. No. 16/379,212, filed on Apr. 9, 2019, which claims priority to U.S. Provisional Application Ser. No. 62/654,870, filed on Apr. 9, 2018, and this application also claims priority to U.S. Provisional Application Ser. No. 62/928,010, filed on Oct. 30, 2019, the contents of which is hereby incorporated by reference in its entirety.

STATEMENT REGARDING FEDERALLY SPONSORED RESEARCH OR DEVELOPMENT

This invention was made with government support under N00014-16-1-2833 awarded by the Office of Naval Research (ONR). The government has certain rights in the invention.

FIELD OF THE DISCLOSURE

Described herein is a direct liquid-fuel/oxidant fuel cell with an alkaline anodic fuel stream including a solution of fuels including, but not limited to, low molecular weight alcohols, such as methanol, ethanol, dimethyl ether, glycols, and hydrazine hydrate, and an acidic cathode oxidant stream including a solution of oxidant, including but not limited to, hydrogen peroxide and perchlorates or a gaseous oxidant stream including oxygen or air. A gradient in pH between the anode and cathode is maintained by a microscale bipolar interface positioned someplace within the membrane electrode assembly, including at the anode-membrane interface, and/or at the cathode-membrane interface. The maintenance of a steep pH gradient enables realization of cells with much higher voltages as compared to cells operating at a uniform pH. Also described herein is a transposed configuration wherein the anode maintains an acidic pH and the cathode an alkaline pH.

BACKGROUND OF THE DISCLOSURE

Electrochemical energy conversion and storage devices usually operate at uniform pH or over a narrow pH range. For example, anion exchange membrane fuel cells (AEMFCs) and anion exchange membrane water electrolyzers (AEMWEs) both operate at high pH, while proton exchange membrane fuel cells (PEMFCs) and proton exchange membrane water electrolyzers (PEMWEs) both operate at low pH. The uniform pH environment of these devices frequently hampers the facility of one of the half-cell reactions. In PEMFCs/PEMWEs, where both the anode and cathode operate at acidic pH, the hydrogen oxidation/evolution reaction is quite facile while the oxygen reduction/evolution reaction is sluggish. In AEMFCs/AEMWEs, the converse is true. Moreover, the chemical stability of some reactants depends strongly on the pH. For example, hydrogen peroxide disproportionates at high pH but is stable at low pH. Therefore, a direct liquid-fuel/hydrogen peroxide fuel cell using hydrogen peroxide as oxidant can only be operated effectively by maintaining different pH at the anode and cathode. Thus, if electrochemical devices can be designed with an interfacial pH gradient that enables decoupled pH at the two electrodes, it is possible to: a) enhance half-cell reaction kinetics; b) significantly expand the selection of electrocatalysts (especially non-noble-metal electrocatalysts) that can be used, and c) broaden the selection of (combinations of) fuels and oxidants that can be employed.

Hybrid AEM/cation exchange membrane (CEM) bipolar configurations for $H_2/O_2$ fuel cells have been previously demonstrated. The $H_2/O_2$ fuel cell with an AEM/CEM bipolar configuration yielded a current density of a few tens of $mA/cm^2$, which was low compared to state-of-the-art PEMFCs and AEMFCs. The lower performance was attributed to non-optimized fabrication methods for the bipolar electrode assembly and to the large membrane thickness (174 m). To improve performance, a modified bipolar interface was employed, wherein the AEM component was integrated within a high-pH anion conducting electrode, which was directly coupled to a Nation® membrane. By using this modified bipolar interface, the ionic resistance contribution of the AEM was avoided and the bipolar junction resided closer to the electrode, allowing for higher transport rates. This device yielded enhanced performance with a peak power density of 62 $mW/cm^2$ in $H_2/O_2$ mode, though this was still significantly lower than a state-of-the-art PEMFC. Devices prepared with this modified design provided a key advantage compared with traditional PEMFCs, namely self-humidification by water generated at the bipolar interface that enabled operation under dry conditions. The concept of the bipolar interface described above offers interesting possibilities if the overall performance of the device employing the interface can be improved.

Direct methanol fuel cells (DMFCs) and direct ethanol fuel cells (DEFCs) have been considered as suitable power suppliers for portable and mobile devices. The liquid fuels used in DMFC and DEFC, respectively methanol and ethanol are easier to be stored and transported compared with compressed $H_2$ fuel widely used for proton exchange membrane fuel cells. However, the high fuel cross-over rate observed when using perfluorosulfonic-based membranes such as Nafion®, has resulted in fuel loss and reduced fuel cell voltage. Also, DMFCs and DEFCs are operated most commonly with $O_2$ (in air) as oxidant, which results in low cell voltage.

Demonstrated herein is the use of a pH-gradient-enabled microscale-bipolar interface in DMFC/DEFC devices. The bipolar interface configuration enables operation of fuel cells at high voltage, allows the use of non-noble catalysts for the anode, minimizes the crossover of fuels and oxidant, and provides an acceptable current density. The high performance of the DMFC/DEFC enables a potential usage in transportation such as fuel cell automobiles, either as the primary stack or in a range-extender application, as well as in stationary power and portable power applications.

BRIEF DESCRIPTION OF THE DISCLOSURE

In one embodiment, the present disclosure is directed to a method of electrochemical conversion from combining an oxidant and a fuel source comprising a liquid fuel. The method comprises introducing either an oxidant or a fuel source comprising a liquid fuel to a first electrode comprising a first catalyst coated by a first ion exchange ionomer; or introducing either an oxidant or a fuel source comprising a liquid fuel to a second electrode comprising a second catalyst coated by a second ion exchange ionomer.

DETAILED DESCRIPTION OF THE DISCLOSURE

Figure 1A:
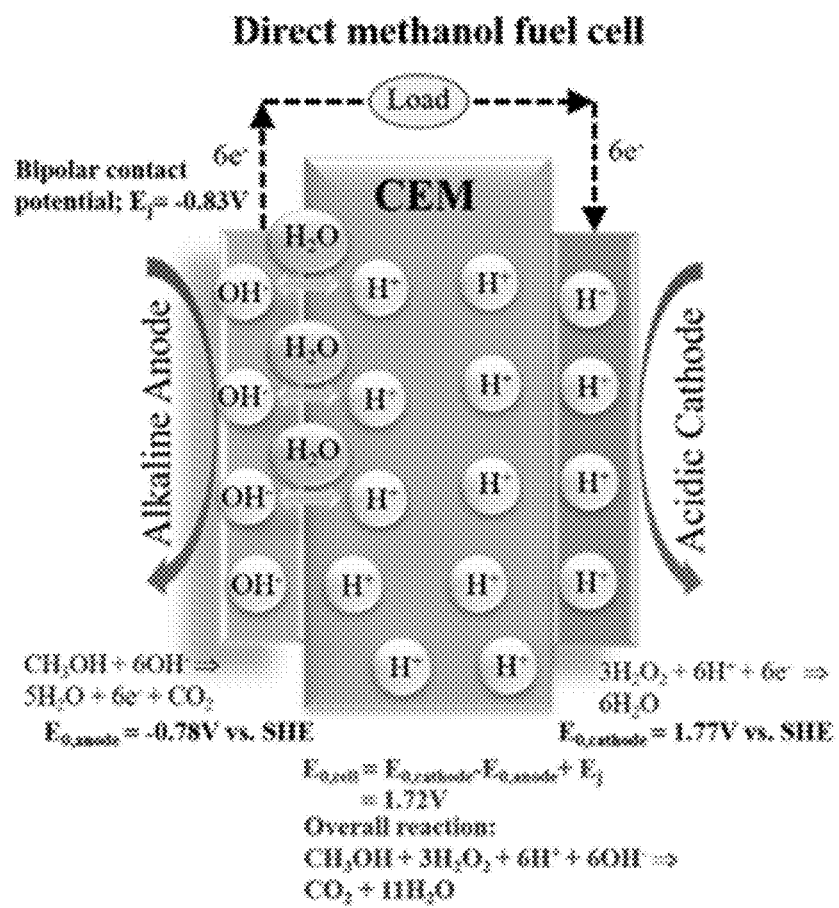
FIG. 1A is a depiction of an exemplary embodiment of half-cell and overall reactions in a direct methanol/hydrogen peroxide fuel cell (DMFC) with an anodic bipolar interface in accordance with the present disclosure.

In some embodiments of the present disclosure, a method of electrochemical conversion from combining an oxidant and a fuel source comprising a liquid fuel is disclosed. The method comprises introducing either an oxidant or a fuel source comprising a liquid fuel to a first electrode comprising a first catalyst coated by a first ion exchange ionomer; or introducing either an oxidant or a fuel source comprising a liquid fuel to a second electrode comprising a second catalyst coated by a second ion exchange ionomer.

In some embodiments, the first ion exchange ionomer and the second ion exchange ionomer are each independently selected from an anion exchange ionomer and a cation exchange ionomer.

In some embodiments, the first electrode and the second electrode are separated by an ion exchange membrane.

In some embodiments, a reaction with a reduced or oxidized species from the first electrode and an oxidized or reduced species from the second electrode occurs at an interface between the ion exchange ionomer coating and the ion exchange membrane. In some embodiments, the reaction results in splitting water, forming water, forming a compound produced by a half-cell reaction occurring at the first electrode and the second electrode, or forming a compound produced by an overall full cell reaction.

In some embodiments, the ion exchange membrane is a cation membrane or an anion exchange membrane.

In some embodiments, the first catalyst is a metallic or a non-metallic particle or a metallic or a non-metallic film comprising a material selected from the group consisting of Ni, Pt, Pd, Ir, Au, Ag, CoO, a noble metal, a metal alloy thereof, a metal mixture thereof, and combinations thereof.

In some embodiments, the second catalyst is a metallic or a non-metallic particle or a metallic or a non-metallic film comprising a material selected from the group consisting of Ni, Pt, Pd, Ir, Au, Ag, CoO, a noble metal, a metal alloy thereof, a metal mixture thereof, and combinations thereof.

In some embodiments, the cation exchange membrane or cation exchange ionomer comprises a material selected from one or more of the group consisting of Nafion®212, Nafion®115, Nafion®117, polymers having a chemical formula of $(C_7HF_{13}O_5S \cdot C_2F_4)_x$, sulfonated polystyrene-block-poly(ethylene-ran-butylene)-block-polystyrene tri-block copolymer, sulfonated poly (phenylene oxide), BAM (Ballard), poly(ethylene-co-tetrafluoroethylene)-graft-poly(styrene sulfonic acid), poly(vinylidene fluoride)-graft-poly(styrene sulfonic acid), sulfonated poly(arylene ether ether ketone), sulfonated poly(4-phenoxybenzoyl-1,4-phenylene), sulfonated polysulfone, and combinations thereof.

Nafion® is a perfluorinated ion exchange membrane.

Nafion®212 is a perfluorinated membrane having a thickness of 0.002 inches and a chemical formula of $(C_7HF_{13}O_5S \cdot C_2F_4)_x$ in the following structural orientation, where the value of m/(m+n) is in the range of from about 0.001 to about 1:

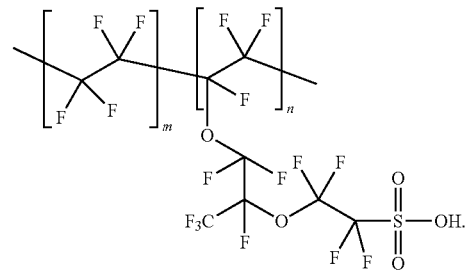

Nafion®115 is a perfluorinated membrane having a thickness of 0.005 inches and a chemical formula of $(C_7HF_{13}O_5S \cdot C_2F_4)_x$ in the following structural orientation, where the value of m/(m+n) is in the range of from about 0.001 to about 1:

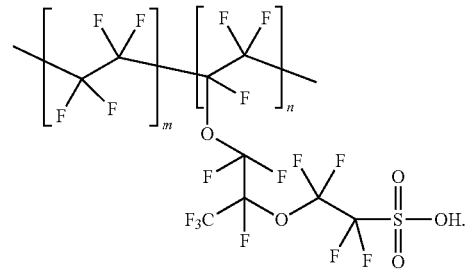

Nafion®117 is a perfluorinated membrane having a thickness of 0.007 inches and a chemical formula of $(C_7HF_{13}O_5S \cdot C_2F_4)_x$ in the following structural orientation, where the value of m/(m+n) is in the range of from about 0.001 to about 1:

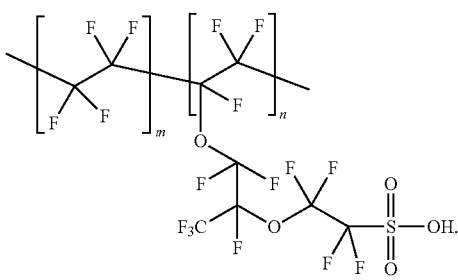

In some embodiments, the anion exchange membrane or anion exchange ionomer comprises a material selected from one or more of the group consisting of a polystyrene-block-poly(ethylene-ran-butylene)-block-polystyrene tri-block copolymer-based backbone, poly (phenylene oxide)-based backbone, polysulfone-based backbone, poly(N,N-diallylazacycloalkane)-based backbone, bromoalkyl-tethered poly (biphenyl alkylene)-based backbone, multiblock copoly (arylene ether)-based backbone, poly (vinylbenzyl chloride)-based backbone, cardo-polyetherketone-based backbone, and combinations thereof.

In some embodiments, the backbone comprises a functional group selected from one or more of the group consisting of benzyl-trimethylammonium, benzyl-imidazolium, guanidium, benzyl-tris (2, 4, 6-trimethoxyphenyl) phosphonium, permethyl cobaltocenium, 1,4-dimethylpiperazinium, benzyl-trimethylphosphonium, and combinations thereof.

In some embodiments, the cation exchange ionomer comprises a material selected from one or more of the group consisting of sulfonated polystyrene-block-poly(ethylene-ran-butylene)-block-polystyrene tri-block copolymer, perfluorinated Nafion® solution, a solution comprising a polymer having a chemical formula of $(C_7HF_{13}O_5S \cdot C_2F_4)_x$, sulfonated poly (phenylene oxide), sulfonated polysulfone, sulfonated poly (arylene ether ether ketone), sulfonated poly(4-phenoxybenzoyl-1,4-phenylene), and combinations thereof.

In some embodiments, the reducing agent or the oxidizing agent is fed contacted with the electrodes in a single-pass mode or in a recycle mode.

In some embodiments, the first ion exchange ionomer coating or the second ion exchange ionomer coating is of a thickness and coverage sufficient to increase a pH gradient across the interface compared to a pH gradient without the ionomer coating; to provide a pH gradient of about 1 pH unit per nm of the interface; or prevent catholyte contact with an anode active site.

In some embodiments, the oxidant is selected from hydrogen peroxide, oxygen, and perchlorate.

In some embodiments, the liquid fuel is selected from an alcohol, an ether, glycol, and hydrazine hydrate.

In some embodiments, the alcohol is selected from methanol and ethanol.

In some embodiments, the concentration of the fuel source is in the range of from about 0.01 M to about 25 M, from about 0.05 M to about 20 M, from about 0.1 M to about 10 M, from about 0.5 M to about 5 M, or from about 1 M to about 3 M.

As disclosed herein, the microscale-bipolar interface has been demonstrated to be able to maintain large pH gradients between acidic and alkaline phases in ex-situ tests. Further, such interfaces have been used in DMFC/DEFC devices. As further detailed herein, a high voltage DMFC device was obtained with an open circuit voltage of 1.9 V. The DMFC yielded a promising peak power density of 280 mW/cm². A high voltage DEFC device was also obtained with an open circuit voltage of 1.5 V. The DEFC yielded a promising peak power density of 150 mW/cm². Bipolar interface configuration allows for the use of non-platinum group catalysts for an anode and minimizes the crossover of fuels and oxidants. The high performance of the DMFC/DEFC enables a potential usage in transportation such as fuel cell automobile stacks and range extenders as well as in stationary power and portable power applications.

There is interest in the field of electrochemical energy generation for the present disclosure. DMFC and DEFC have been considered as suitable power suppliers for portable and mobile devices. The liquid fuels of DMFC and DEMC are easier to be stored and transported compared with compressed $H_2$ fuel widely used for proton exchange membrane fuel cells. However, the high fuel cross-over rate observed when using perfluorosulfonic-based membrane, such as Nafion®, has resulted in fuel loss and reduced fuel cell voltage. In some embodiments, the first ion exchange ionomer or the second ion exchange ionomer comprise a chemically stabilized perfluorosulfonic acid/PTFE copolymer in the acid (H+) form. Also, DMFC and DEFC have been operated most commonly with $O_2$ as the oxidant, which results in low cell voltage. Herein, a pH-gradient-enabled microscale bipolar interface configuration is incorporated in electrochemical cells operated with liquid fuels and $H_2O_2$ as an oxidant. This setup enables operation of high voltage fuel cell devices with minimized fuels crossover and provides an acceptable current density (150~250 mA/cm²) at 1.0 V.

EXAMPLES

Preparation and Characterization of pH-Gradient-Enabled Microscale Bipolar Interface (PMBI)

The structure and formation of the bipolar interface in accordance with this example is disclosed in U.S. patent application Ser. No. 16/379,212, filed on Apr. 9, 2019, which claims priority from U.S. Provisional Application Ser. No. 62/654,870 filed on Apr. 9, 2018, both of which are incorporated herein by reference in their entirety.

Direct Methanol/Hydrogen Peroxide Fuel Cell

Half-Cell and Overall Reactions in a DMFC with Bipolar Interface $$\text{Anode:} CH_3OH + 6OH^- \rightarrow 5H_2O + 6e^- + CO_2 \; E^{0,a} = -0.78V \text{ vs. SHE} \quad (1)$$

$$\text{Cathode:} 3H_2O_2 + 6H^+ + 6e^- \rightarrow 6H_2O \; E^{0,c} = 1.77V \text{ vs. SHE} \quad (2)$$

$$\text{Overall reaction:} CH_3OH + 3H_2O_2 + 6H^+ + 6OH^- \rightarrow CO_2 + 11H_2O \; E^0 = 2.55V \quad (3)$$

The junction potential correction has been evaluated to be:

$$3M \; KOH \| 1.5M \; H_2SO_4 E_j = 0.83V \quad (4)$$

This value was estimated based on the detailed derivation provided by Ünlü, M.; Zhou, J.; Kohl, P. A., "Hybrid Anion and Proton Exchange Membrane Fuel Cells", The Journal of Physical Chemistry C 2009, 113, (26), 11416-11423, and together with equation (3) to yield the net cell voltage.

$$\text{Net cell voltage:} E^0 - E_j = 1.72V \quad (5)$$

Figure 1B:
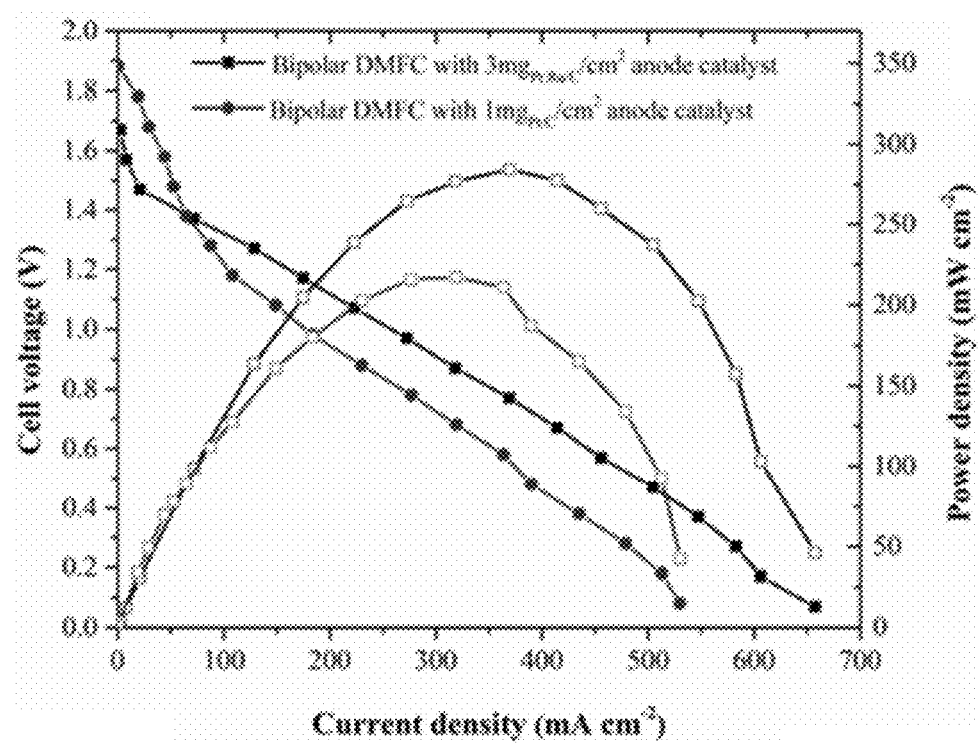
FIG. 1B is a graphical depiction of an exemplary embodiment of the impact of anode catalyst loading on the performance of a DMFC with an anodic bipolar interface in accordance with the present disclosure. Closed symbols represent cell voltage and open symbols represent power density.

The theoretical open circuit voltage (OCV) of a DMFC with a bipolar interface is 1.72 V. A peak power density of 306 mW/cm² with an OCV of 1.64 V was obtained upon initial optimization of the device. This setup enabled high voltage fuel cell device operation with minimized fuel/oxidant crossover and provided an acceptable current density (250 mA/cm$^2$) at 1.0 V. PtRu/C on Ni-foam was utilized as the catalyst at the anode and Pt/C was utilized as the catalyst at the cathode. A loading of 3 mg$_{Pt-Ru/C}$/cm$^2$ at the anode achieved the best DMFC performance. Results are shown in FIG. 1B.

Half-Cell and Overall Reactions in a DMFC without the Bipolar Interface.

$$\text{Anode:} CH_3OH + 6OH^- \Rightarrow 5H_2O + 6e^- + CO_2 \ E^{0,a} = -0.78V \text{ vs. SHE} \quad (7)$$

$$\text{Cathode:} 3H_2O_2 + 6H^+ + 6e^- \rightarrow 6H_2O \ E^{0,c} = 1.77V \text{ vs. SHE} \quad (8)$$

$$\text{Overall reaction:} CH_3OH + 3H_2O_2 + 6H^{3O+} + 6OH^- \Rightarrow CO_2 + 11H_2O \ E^0 = 2.55V \quad (9)$$

Though the theoretical OCV of a DMFC without a bipolar interface is higher (2.55 V) than a DMFC with a bipolar interface (1.72 V), most DMFCs were operated below 1 V. The uniform pH environment at anode and cathode in a DMFC resulted in low cell voltage due to the crossover of fuels and oxidant.

Impact of Methanol Concentration on Performance.

Figure 2:
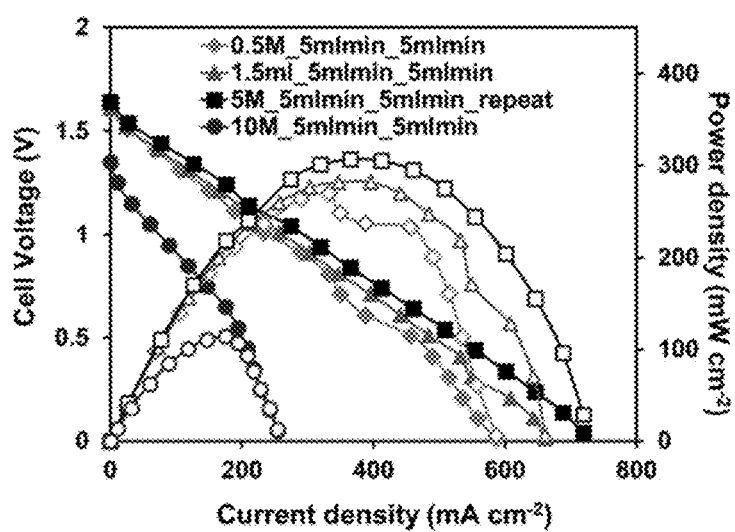
FIG. 2 is a graphical depiction of an exemplary embodiment of the impact of methanol fuel stream concentration on the performance of a DMFC in accordance with the present disclosure. Closed symbols represent cell voltage and open symbols represent power density.

The current produced by an ideal electrochemical device is directly proportional to the amount of reactant supplied. In a DMFC, this anticipated improvement in performance has to be balanced against the cross-over of methanol from the anode to the cathode side and the subsequent side-reaction at the cathode. Increasing the fuel concentration results in a larger methanol concentration gradient across the device and drives methanol cross-over. Examining the performance of a DMFC with 0.5 M, 1.5 M, 5 M and 10 M methanol feeds, the cell with a 5M methanol feed was found to yield the best performance. Results are shown in FIG. 2.

Impact of Asymmetric Fuel and Oxidant Flow Rates on Performance.

Figure 3:
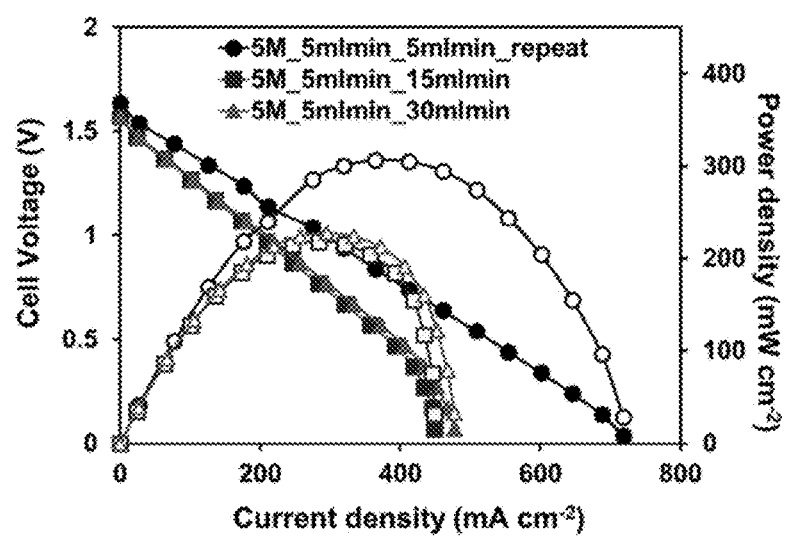
FIG. 3 is a graphical depiction of an exemplary embodiment of the impact of increased oxidant flow on the performance of a DMFC in accordance with the present disclosure. Closed symbols represent cell voltage and open symbols represent power density.

As detailed above, 5 M methanol was identified as the optimal fuel concentration. The stoichiometric ratio of methanol and hydrogen peroxide is in the ratio of 1:3 as seen from Eq. (3). Unfortunately, given the relative instability of hydrogen peroxide, solutions above 30 wt % of hydrogen peroxide (about 10 M) in water are not readily available. Further, the acid stabilized oxidant feed of hydrogen peroxide is further diluted to accommodate the acid and hence has a hydrogen peroxide molarity of about 5 M. Given that the methanol feed is 5 M, stoichiometry indicates that a minimum oxidant molarity of 15 M is required. Thus, the effect of increasing the oxidant flow rate on DMFC performance with fuel to oxidant flow rate ratios of 1:1, 1:3 and 1:6 was examined. Results are shown in FIG. 3. Surprisingly, the DMFC with 1:1 flow ratio exhibited the best performance. Oxidant residence time contributed to this unexpected effect.

Figure 4:
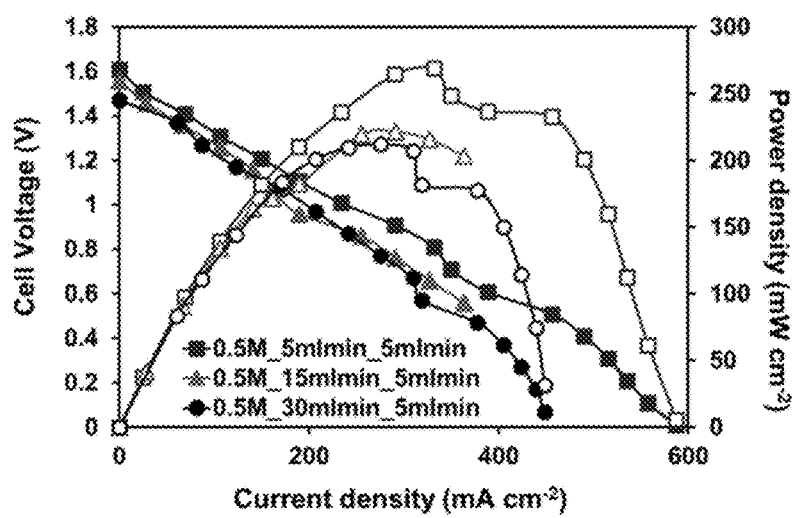
FIG. 4 is a graphical depiction of an exemplary embodiment of the impact of increased fuel flow on the performance of a DMFC in accordance with the present disclosure. Closed symbols represent cell voltage and open symbols represent power density.
Figure 5:
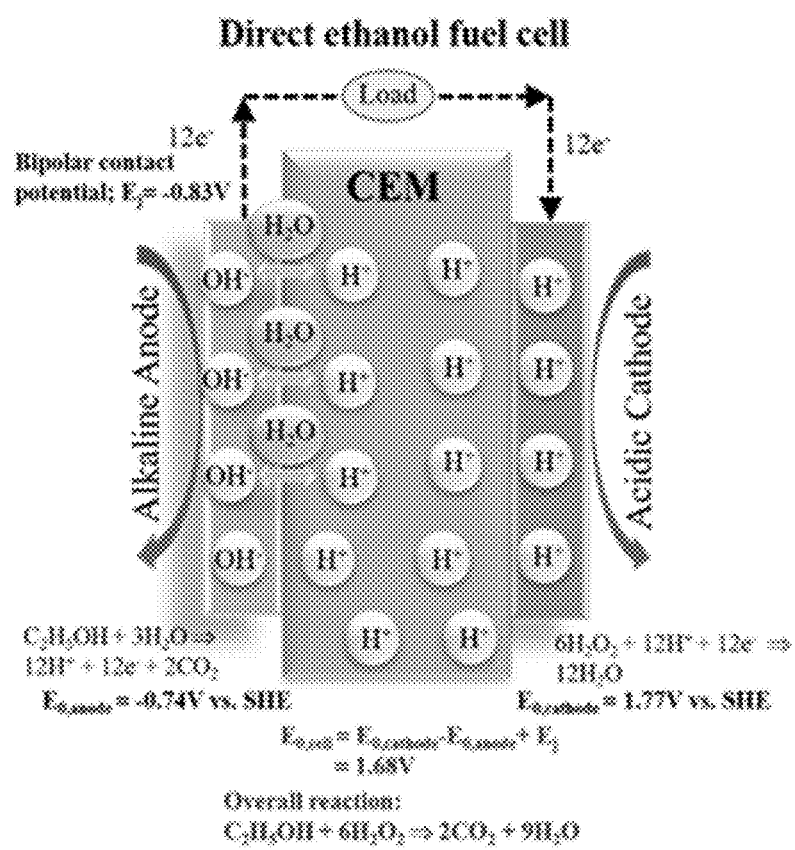
FIG. 5 is a depiction of an exemplary embodiment of half-cell and overall reactions in a direct ethanol/hydrogen peroxide fuel cell (DEFC) with an anodic bipolar interface in accordance with the present disclosure.
Figure 6:
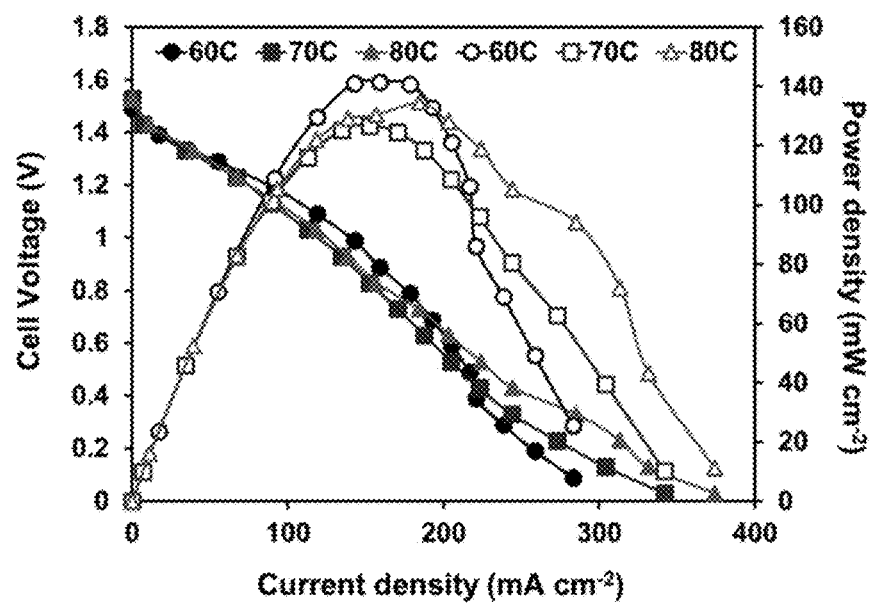
FIG. 6 is a graphical depiction of an exemplary embodiment of the impact of operating temperature on the performance of a DEFC in accordance with the present disclosure. Closed symbols represent cell voltage and open symbols represent power density.

Methanol cross-over is a significant issue in DMFCs. One solution to reducing methanol cross-over is to lower the fuel feed concentration. This creates the opposite problem of excess (non-stoichiometric) oxidant concentration. Thus, the impact of increasing the oxidant flow rate on DMFC performance was examined. Starting off with a fuel concentration of 0.5 M and an oxidant concentration of about 5 M (with a stoichiometrically required oxidant concentration being 1.5 M), fuel to oxidant flow rate ratios of 1:1, 3:1, and 6:1 were examined. Once again, surprisingly, the DMFC with 1:1 flow ratio exhibited the best performance. The results are shown in FIG. 4. Oxidant residence time and methanol cross-over contributed to this unexpected effect.

Direct Ethanol/Hydrogen Peroxide Fuel Cell

Half-Cell and Overall Reactions in a DEFC with Bipolar Interface.

$$\text{Anode:} C_2H_5OH + 3H_2O \Rightarrow 12H^+ + 12e^- + 2CO_2 \ E^{0,a} = -0.74V \text{ vs. SHE} \quad (10)$$

$$\text{Cathode:} 6H_2O_2 + 12H^+ + 12e^- \rightarrow 12H_2O \ E^{0,c} = 1.77V \text{ vs. SHE} \quad (11)$$

$$\text{Overall reaction:} C_2H_5OH + 6H_2O_2 \Rightarrow 2CO_2 + 9H_2O \ E^0 = 2.51V \quad (12)$$

The junction potential correction has been evaluated to be:

$$3M \ KOH \| 1.5M \ H_2SO_4 E_j = 0.83V \quad (13)$$

This value was estimated based on the detailed derivation provided by Ünlü, M.; Zhou, J.; Kohl, P. A., "Hybrid Anion and Proton Exchange Membrane Fuel Cells", The Journal of Physical Chemistry C 2009, 113, (26), 11416-11423, and together with equation (12) to yield the net cell voltage.

$$\text{Net cell voltage:} E^0 - E_j = 1.68V \quad (14)$$

A peak power density of 150 mW/cm$^2$ was obtained for DEFC with cell voltage of 1.5 V. PtRu/C on Ni-foam was utilized as the catalyst at the anode and Pt/C was utilized as the catalyst at the cathode. The optimum concentration of ethanol was 1.5 M and optimum operating temperature was 60° C.

Half-Cell and Overall Reactions in a DMFC without Bipolar Interface.

$$\text{Anode:} C_2H_5OH + 3H_2O \Rightarrow 12H^+ + 12e^- + 2CO_2 \ E^{0,a} = -0.74V \text{ vs. SHE} \quad (15)$$

$$\text{Cathode:} 6H_2O_2 + 12H^+ 12e^- \rightarrow 12H_2O \ E^{0,c} = 1.77V \text{ vs. SHE} \quad (16)$$

$$\text{Overall reaction:} C_2H_5OH + 6H_2O_2 \Rightarrow 2CO_2 + 9H_2O \ E^0 = 2.51V \quad (17)$$

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

What is claimed is:

1. A method of electrochemical conversion from combining a solution of oxidant and a fuel source comprising a liquid fuel, the method comprising:
    introducing either a solution of oxidant or a fuel source comprising a liquid fuel to a first electrode comprising a first catalyst coated by a first ion exchange ionomer; or
    introducing either a solution of oxidant or a fuel source comprising a liquid fuel to a second electrode comprising a second catalyst coated by a second ion exchange ionomer;
    wherein the first electrode and the second electrode are separated by an ion exchange membrane;
    wherein the solution of oxidant or the fuel source is fed contacted with the electrodes in a single-pass mode or in a recycle mode; and
    wherein the solution of oxidant and the fuel source comprising a liquid fuel are introduced in a fuel to oxidant flow rate ratio that is less than or equal to 33% of a stoichiometric fuel to oxidant flow rate ratio.

2. The method of claim 1, wherein the first ion exchange ionomer and the second ion exchange ionomer are each independently selected from the group consisting of anion exchange ionomers and cation exchange ionomers.

3. The method of claim 2, wherein the cation exchange ionomer comprises a material selected from the group consisting of sulfonated polystyrene-block-poly(ethylene-ran-butylene)-block-polystyrene tri-block copolymer, sulfonated tetrafluoroethylene based-copolymer solution, sulfonated poly (phenylene oxide), sulfonated polysulfone, sulfonated poly (arylene ether ketone), sulfonated poly(4-phenoxybenzoyl-1,4-phenylene), and combinations thereof.

4. The method of claim 1, wherein the ion exchange membrane is selected from the group consisting of cation exchange membranes, anion exchange membranes, microscale bipolar interfaces, and combinations thereof.

5. The method of claim 4, wherein the first ion exchange ionomer and the second ion exchange ionomer are each independently selected from the group consisting of anion exchange ionomers and cation exchange ionomers, and wherein the anion exchange membrane or anion exchange ionomer comprises a material selected from the group consisting of a polystyrene-block-poly(ethylene-ran-butylene)-block-polystyrene tri-block copolymer-based backbone, poly (phenylene oxide)-based backbone, polysulfone-based backbone, poly(N,N-diallylazacycloalkane)-based backbone, bromoalkyl-tethered poly(biphenyl alkylene)-based backbone, multiblock copoly(arylene ether)-based backbone, poly (vinylbenzyl chloride)-based backbone, cardo-polyetherketone-based backbone, and combinations thereof.

6. The method of claim 4, wherein the first ion exchange ionomer and the second ion exchange ionomer are each independently selected from the group consisting of anion exchange ionomers and cation exchange ionomers, and wherein the anion exchange membrane or anion exchange ionomer comprises a functional group selected from the group consisting of benzyl-trimethylammonium, benzyl-imidazolium, guanidium, benzyl-tris (2, 4, 6-trimethoxyphenyl) phosphonium, permethyl cobaltocenium, 1,4-dimethylpiperazinium, benzyl-trimethylphosphonium, and combinations thereof.

7. The method of claim 1, wherein a reaction with a reduced or oxidized species from the first electrode and an oxidized or reduced species from the second electrode occurs at the ion exchange membrane.

8. The method of claim 7, wherein the reaction results in splitting water, forming water, forming a compound produced by a half-cell reaction occurring at the first electrode and the second electrode, or forming a compound produced by an overall full cell reaction.

9. The method of claim 1, wherein
    the first catalyst is a metallic or a non-metallic particle or a metallic or a non-metallic film comprising a material selected from the group consisting of CoO, a noble metal, a metal alloy thereof, a metal mixture thereof, and a combination thereof; or
    the second catalyst is a metallic or a non-metallic particle or a metallic or a non-metallic film comprising a material selected from the group consisting of CoO, a noble metal, a metal alloy thereof, a metal mixture thereof, and a combination thereof.

10. The method of claim 1, wherein the first ion exchange ionomer or the second ion exchange ionomer comprises a material selected from the group consisting of:
    a perfluorinated membrane having a thickness of 0.002 inches and a chemical formula of $(C_7HF_{13}O_5S \cdot C_2F_4)_x$ in the following structural orientation, wherein the value of m/(m+n) is in the range of from about 0.001 to about 1:

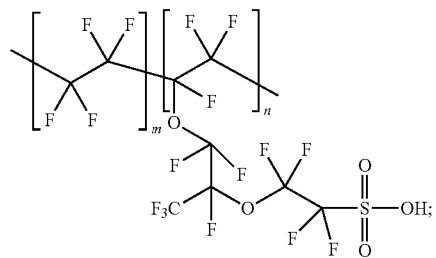

a perfluorinated membrane having a thickness of 0.005 inches and a chemical formula of $(C_7HF_{13}O_5S \cdot C_2F_4)_x$ in the following structural orientation, wherein the value of m/(m+n) is in the range of from about 0.001 to about 1:

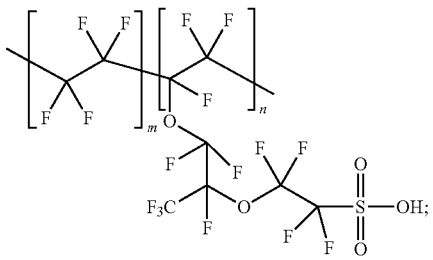

a perfluorinated membrane having a thickness of 0.007 inches and a chemical formula of $(C_7HF_{13}O_5S \cdot C_2F_4)_x$ in the following structural orientation, wherein the value of m/(m+n) is in the range of from about 0.001 to about 1:

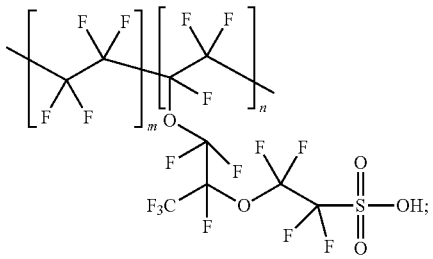

sulfonated polystyrene-block-poly(ethylene-ran-butylene)-block-polystyrene tri-block copolymer, sulfonated poly (phenylene oxide), poly(ethylene-co-tetrafluoroethylene)-graft-poly(styrene sulfonic acid), poly(vinylidene fluoride)-graft-poly(styrene sulfonic acid), sulfonated poly(arylene ether ether ketone), sulfonated poly(4-phenoxybenzoyl-1,4-phenylene), sulfonated polysulfone, and combinations thereof.

11. The method of claim 1, wherein the first ion exchange ionomer coating or the second ion exchange ionomer coating is of a thickness and coverage sufficient to increase a pH gradient across the ion exchange membrane compared to a pH gradient without the first ion exchange ionomer coating or without the second ion exchange ionomer coating.

12. The method of claim 1, wherein the first ion exchange ionomer coating or the second ion exchange ionomer coating is of a thickness and a coverage sufficient to provide a pH gradient of about 1 pH unit per nm of the ion exchange membrane.

13. The method of claim 1, wherein the first ion exchange ionomer coating or the second ion exchange ionomer coating is of a thickness and a coverage sufficient to prevent catholyte contact with an anode active site.

14. The method of claim 1, wherein the solution of oxidant comprises an oxidant selected from the group consisting of hydrogen peroxide, oxygen, and perchlorate.

15. The method of claim 1, wherein the liquid fuel is selected from the group consisting of an alcohol, an ether, and hydrazine hydrate.

16. The method of claim 15, wherein the alcohol is selected from the group consisting of glycol, methanol, and ethanol.

17. The method of claim 1, wherein the concentration of the fuel source is in the range of from about 0.01 M to about 25 M.

18. The method of claim 1, wherein the concentration of the fuel source is in the range of from about 0.1 M to about 10 M.

19. The method of claim 1, wherein
the first catalyst is a metallic or a non-metallic particle or a metallic or a non-metallic film comprising a material selected from the group consisting of Ni, Pt, Pd, Ir, Au, Ag, CoO, a metal alloy thereof, a metal mixture thereof, and a combination thereof; or
the second catalyst is a metallic or a non-metallic particle or a metallic or a non-metallic film comprising a material selected from the group consisting of Ni, Pt, Pd, Ir, Au, Ag, CoO, a metal alloy thereof, a metal mixture thereof, and a combination thereof.

* * * * *